Sept. 8, 1970        A. L. KOTLER        3,526,909
HAMMOCK SPREADER BARS
Filed Sept. 24, 1968
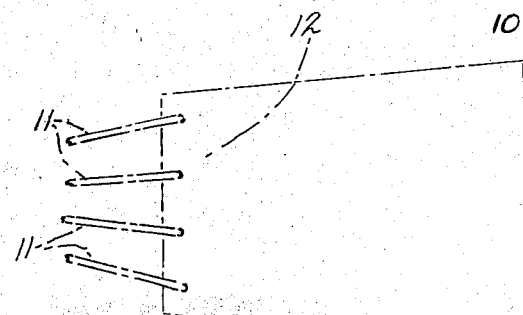
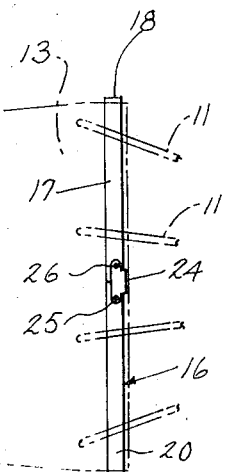
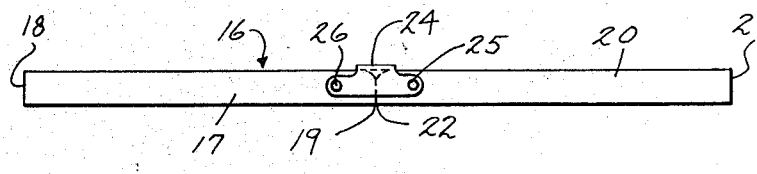
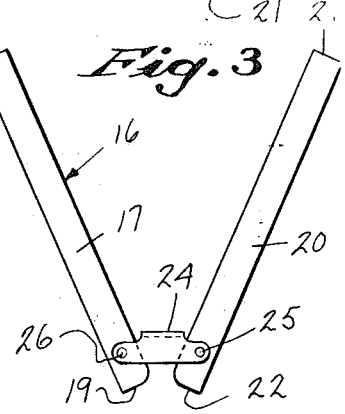
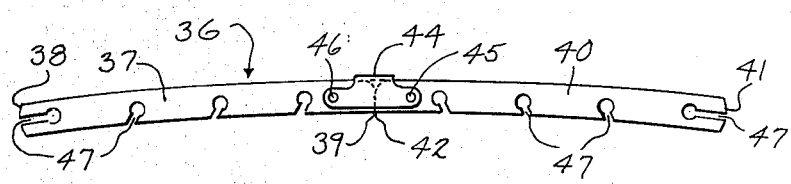
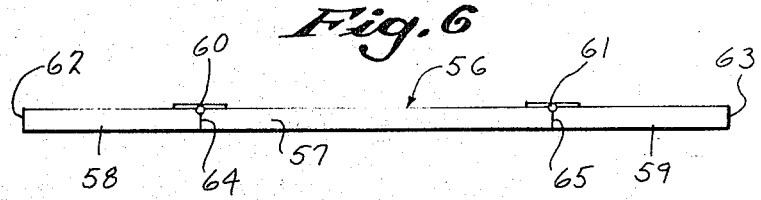
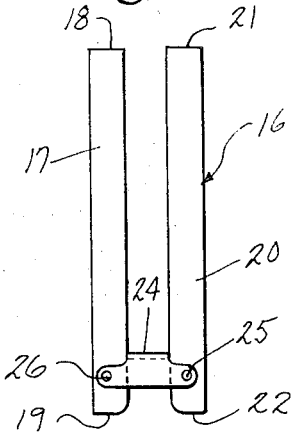
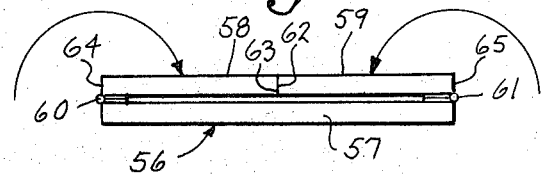
INVENTOR
AARON L. KOTLER
BY
*Morsell & Morsell*
ATTORNEYS United States Patent Office
3,526,909
Patented Sept. 8, 1970

3,526,909
HAMMOCK SPREADER BARS
Aaron L. Kotler, Beverly Hills, Calif., assignor to Algoma Net Company, Algoma, Wis., a corporation of Wisconsin
Filed Sept. 24, 1968, Ser. No. 761,938
Int. Cl. A45f 3/22
U.S. Cl. 5—123    1 Claim

ABSTRACT OF THE DISCLOSURE

A spreader bar for the end of a hammock bed which bar is provided with one or more hinged joints intermediate its length to permit it to be folded over upon itself when not installed in a hammock bed to permit said bed and spreader bar to be arranged in relatively small, compact package for convenient and economical shipment or storage.

BACKGROUND OF THE INVENTION

Field of the invention

The present invention relates to the art of manufacturing hammocks, and more particularly to spreader bars for use in hammocks.

Description of the prior art

Heretofore the spreader bar (sometimes referred to as the header bar), which ordinarily extends transversely across the head end of a canvas or fabric hammock bed to maintain said bed end in a spread condition, is formed of an elongated rigid wooden or metal bar or rod. With such a conventional spreader bar when it is desired to store or ship the bed the size of the package is necessarily dependent upon the length of said spreader bar. Naturally it is economically advantageous, as well as a matter of convenience, to form said bed and spreader bar in as small and compact a unit as possible.

SUMMARY OF THE INVENTION

The present invention provides a new spreader bar for hammocks which is provided with one or more joints permitting said bar to be hingedly doubled over upon itself when it is not installed in a hammock bed in order to reduce the length of said bar for more compact shipment or storage, and which bar and hinge means are so designed that said spreader bar is maintained in a rigid, elongated condition when installed in a hammock bed.

Further objects of the invention are to provide an improved hammock spreader bar which is stronger and more durable than conventional spreader bars, and which improved bar is adapted for use with various types of hammocks and supporting means.

Still further objects of the present invention are to provide a novel and improved hammock spreader bar which is simple in operation, reliable in use, and which is otherwise particularly well adapted for its intended purposes.

BRIEF DESCRIPTION OF THE DRAWINGS

In the accompanying drawings, wherein the same reference numerals designate the same parts in all of the views:

FIG. 1 is a plan view showing a hammock bed, in dot and dash lines, with the improved spreader bar installed therein;

FIG. 2 is a side elevational view of the hinged spreader bar in its extended condition;

FIG. 3 is a side elevational view showing the hinged spreader bar being folded upon itself;

FIG. 4 is a side elevational view of the bar in its folded, compact condition;

FIG. 5 is a side elevational view of a modified form of spreader bar incorporating the invention;

FIG. 6 is a side elevational view of a modified, dual-hinged spreader bar coming within the invention; and FIG. 7 is an elevational view showing the dual-hinged bar of FIG. 6 folded over upon itself.

DESCRIPTION OF THE PREFERRED EMBODIMENTS

Referring now more particularly to FIG. 1 of the drawings, the numeral 10 designates a conventional hammock bed formed of canvas, fabric, or other suitable material. Said hammock bed may be supported by means of strings 11 or the like suspending the same between the ends of a unitary frame, or between two trees or other rigid supports, and includes a foot end 12 and head end 13. Ordinarily the foot end of a hammock bed is devoid of any rigid spreader means, but the head end 13 is provided with a transverse, so-called spreader, bar, sometimes referred to as a header bar, such as the bar 16, which functions to maintain the head end of said hammock bed in a spread condition for the convenience and comfort of a person lying thereon. In actual practice the fabric margin at the head end of the bed is usually turned over and stitched to form a hem fold within which the rigid spreader bar is inserted, although other attachment means can be utilized. It is to be understood, too, that while the spreader bar is ordinarily employed only at the head end of the bed in conventional hammocks, so-called hammock-lounges and certain other hammock styles utilize spreader bars at both ends, and although the spreader bar is described hereinafter as being installed in the bed head end the invention is by no means to be limited in this respect.

As hereinabove mentioned, conventional spreader bars are formed in a single piece, which is of a length equal to the width of the bed, and when it is desired to ship or store the hammock bed it is necessary, of course, that the package or carton be of substantial length to accommodate said bar. As will be readily appreciated, this requires an elongated and unwieldy carton which is not only relatively costly, but which adds substantially to the shipping costs. In addition, such cartons require substantial floor and storage space, which is undesirable as far as dealers and store owners are concerned. For these reasons, the novel spreader bar 16 characterizing the present invention is provided with hinge means permitting said bar to be temporarily hingedly folded over and arranged in a shorter, more compact condition when not in use than is possible with said prior spreader bars, as will now be described.

In the embodiment of the invention illustrated in FIGS. 2–4 the bar 16 includes a first leg or section 17 having an outer end 18 and inner end 19, and a second, aligned section 20 of identical length including an outer end 21 and inner end 22, the inner ends of said sections abutting as shown in FIG. 2 when said bar is in its straight, extended condition.

Pivotally joining the inner ends of said bar sections 17, 20 is a connecting bracket 24 having a solid top element overlying a portion of each of said adjacent bar sections, and integral side wings extending along both sides of said section ends and permanently pivotally secured thereto by rivets 25, 26 or the like. As will be seen in FIG. 2, when the bar sections 17, 20 are in longitudinal alignment the top surfaces thereof bear against the underside of the rigid bracket top and said sections are locked thereby against downward pivotal movement past the illustrated straight, horizontal position. In this condition, when said spreader bar 16 is installed transversely across the head end of a hammock bed, with the bracket top 24 on the outer side thereof as shown in FIG. 1, said bar is effectively maintained in said straight condition. Moreover, if a person lies on the hammock his weight thereon and the resulting transverse forces cause said bar to be even more securely locked in said condition.

When it is desired to form the spreader bar 16 into a smaller, more compact unit, as for shipment or storage, said bar is first manually withdrawn from the bed hem, or otherwise disengaged from the bed, and the sections 17, 20 can be swung toward each other about the pivot bracket 24, as shown in FIGS. 3 and 4. In the fully-pivoted condition shown in FIG. 4 the illustrated bar is one-half of its original length, and can be contained in a substantially smaller carton than is possible with a conventional one-piece spreader bar.

With reference now to FIG. 5 of the drawings, illustrated therein is another style of spreader bar 36 which is arcuate in shape to conform to a similarly-formed hammock bed and which bar is provided with string-receiving holes or slots 47. The purpose of said string-receiving openings is to permit the hammock-supporting strings, cords, or chains to be secured directly to said bar, as is a common practice. It is to be understood, however, that the novel spreader bar comprising the present invention is designed for use with hammocks of diverse types and styles, and having various forms of supporting means, and the invention is not to be limited to one particular style or form of hammock.

Like the form of the invention illustrated in FIGS. 1–4, the spreader bar 36 of FIG. 5 includes a first section 40 having an outer end 41 and inner end 42, and a second, abutting section 37 having an outer end 38 and inner end 39. As in the embodiment of FIGS. 1–4, said bar sections are pivotally joined by a connecting bracket 44, and may be swung together from the illustrated straight position to a folded condition wherein said sections are substantially parallel for greater compactness.

Another modified spreader bar 56 is illustrated in FIG. 6 of the drawings and includes an intermediate section 57, and two end sections 58, 59, each of which end sections is preferably one-half the length of said intermediate section. Said bar end sections 58, 59 are joined to the center section 57 by means of hinge elements 60, 61 which permit said end sections to be pivoted from the illustrated extended position to a position overlying said central section, as shown in FIG. 7. In the latter condition the bar is substantially shorter in length than a conventional spreader bar.

In lieu of the single and dual-hinged units illustrated and hereinabove described, it is also possible to form the spreader bar with three or more hinge connections, and the invention is not to be limited or confined in this respect. Similarly, while the spreader bar comprising the present invention will ordinarily be formed of wood, other materials including metal or plastic could also be employed. Regardless of the particular material selected, incidentally, one of the advantages of the present invention is that the shorter length of the bar sections make the present unit stronger and less susceptible to breakage than conventional one-piece spreader bars.

From the foregoing detailed description it will be seen that the present invention provides a new and improved spreader bar structure for hammock beds having certain advantages over spreader bars of the type heretofore used.

The new hammock spreader bar is provided with one or more joints permitting said bar to be hingedly folded over when it is not installed in a hammock bed in order to reduce its length for more compact shipment or storage. In addition, said improved spreader bar can be used with various types of hammocks and supporting means, it is simple in design and operation, and it is strong and dependable in use.

It is to be understood that while several forms of the present invention have been illustrated and hereinabove described, numerous additional variations or modifications thereof will undoubtedly occur to those skilled in this art. What is intended to be covered herein, therefore, is not only the illustrated embodiments of the invention but also any and all variations or modifications thereof as may come within the spirit of said invention, and within the scope of the following claim.

What I claim is:

1. In combination with a hammock bed having a head end with the outer portion thereof folded over and permanently joined to the bed to form an open-ended hem pocket extending transversely across the head end of said bed, the improved hammock spreader bar, comprising: an elongated bar assembly removably insertable into said bed hem pocket, said bar assembly being adapted to be manually withdrawn when it is desired to fold said bed into a small, compact package for storage or transporting, said bar assembly including a first bar section having an outer end and an inner end and a second bar section of substantially equal length having an outer end and an inner end, and said bar sections being positionable in longitudinal alignment with their inner ends closely adjacent; hinge means pivotally joining the inner end portions of said bar sections, said hinge means including a connecting bracket having a top wall element overlying a portion of each of said adjacent bar sections and preventing pivotal movement of said bar sections in one direction past a substantially straight, horizontal position, and said bracket including integral side wings extending along both sides of said bar section end portions and permanently pivotally secured thereto by rivets, said bar sections being manually pivotal from the substantially straight, horizontal position they assume when said bar assembly is inserted in said bed hem pocket to a folded-over compact condition when withdrawn from said hem pocket to permit the compact packaging of said bed and spreader bar assembly, said hinge bracket being so positioned with its top wall element overlying said adjacent bar portions that when said bar assembly is installed in the bed hem pocket the weight of a person lying on the hammock bed causes said bar assembly to be securely locked in its substantially straight, horizontal position.

References Cited

UNITED STATES PATENTS

| | | | |
|---|---|---|---|
| 339,345 | 4/1886 | Thayer | 5—123 |
| 369,546 | 9/1887 | Nickerson | 5—123 |
| 381,863 | 4/1888 | Travers | 5—123 |
| 492,852 | 3/1893 | Travers | 5—123 |
| 694,071 | 2/1902 | Palmer | 5—123 |
| 725,475 | 4/1903 | Palmer | 5—123 |

FOREIGN PATENTS

| | | |
|---|---|---|
| 462,955 | 3/1937 | Great Britain. |

BOBBY R. GAY, Primary Examiner